Nov. 21, 1961  M. MACCAFERRI  3,009,202
EXTRUSION MACHINES

Filed May 2, 1956  3 Sheets-Sheet 2

INVENTOR.
MARIO MACCAFERRI
BY
Peck + Peck
ATTORNEYS

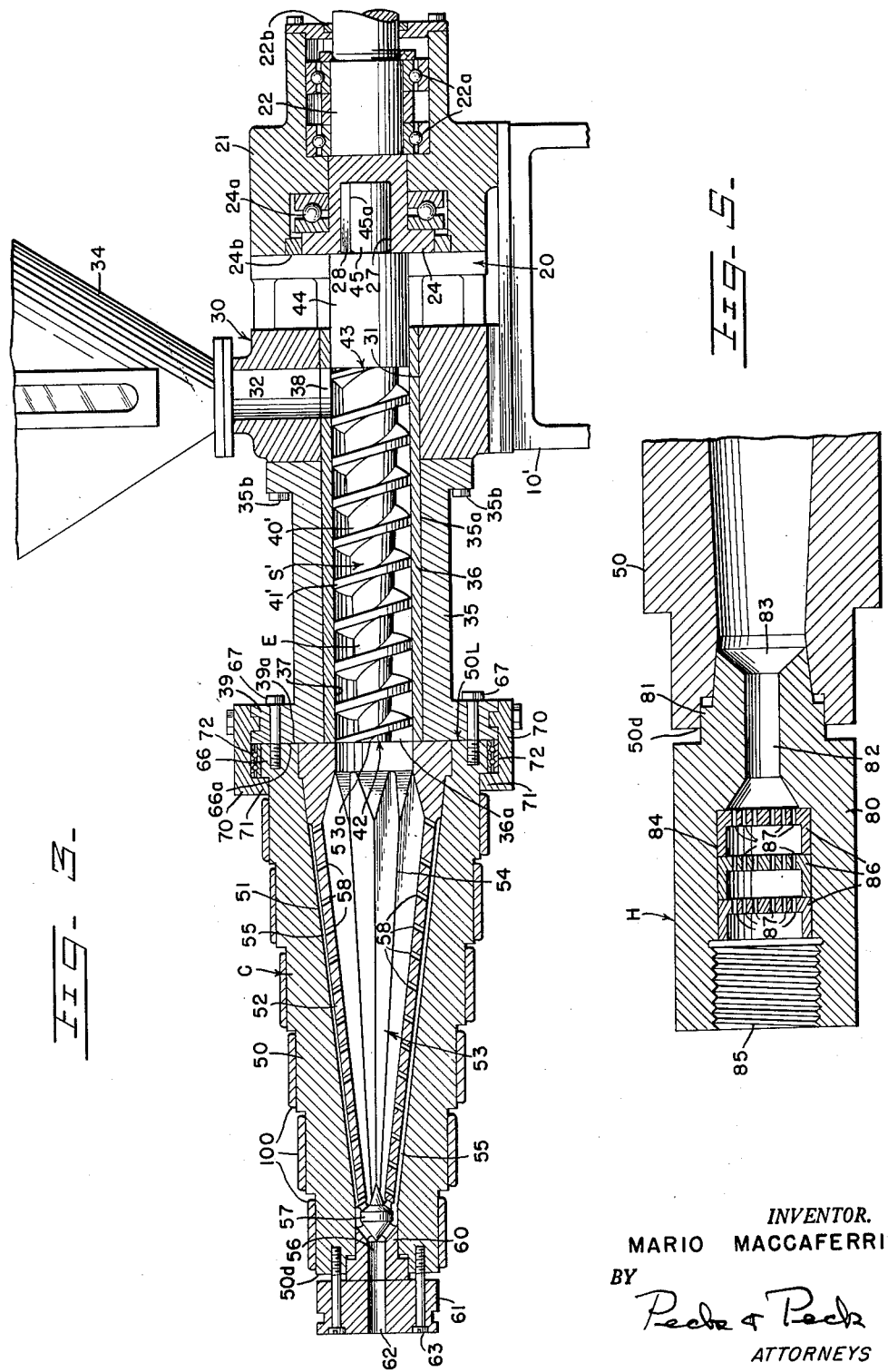

3,009,202
EXTRUSION MACHINES
Mario Maccaferri, 24 Redfield St., Rye, N.Y.
Filed May 2, 1956, Ser. No. 582,157
7 Claims. (Cl. 18—30)

My invention concerns and is directed to extrusion machines, and particularly such machines for plasticizing and extruding thermoplastic materials; and the nature and objects of the invention will be readily recognized and understood by those familiar with and skilled in the arts to which such machines are related in the light of the following explanation and detailed description of the accompanying drawings illustrating what I at present consider to be preferred forms or mechanical and functional expressions of my invention from among various other forms, expressions, modifications, constructions and combinations of which the invention is capable within the broad spirit and scope theerof as defined by the claims hereto appended.

One of the primary objects of the invention is to increase the efficiency of extruding thermoplastic materials by providing for continuous plasticizing and extruding at constant pressure.

Another object is to provide a machine or apparatus for plasticizing and extruding in which the plastic melt is continuously extracted immediately it is melted and extruded under constant pressure so as to thereby eliminate over-heating or burning of the plastic with uniformity of extrudate and high quality of the extruded product.

A further object is to provide an extrusion machine for continuous extrusion at constant pressure in which the plastic is continuously plasticized by the melt extraction principle of plasticizing. A further object is to increase the plasticizing and extruding capacity of plastic extrusion machines.

Another object is to provide for continuous plasticizing and extrusion of thermoplastics utilizing a non-heated extrusion screw component for feeding granulated plastic material to a heating cylinder or chamber of the melt extractor type and for continuously forcing the plastic melt under a constant extrusion pressure from such heating cylinder or chamber.

Another object is to provide an extrusion screw for such an extrusion component which, when in operation to force granulated plastic material to the heating cylinder, will generate a minimum of heat and offer substantially reduced resistance to displacement or flow of the plastic.

A further object is to provide a plasticizing extrusion machine having a heating or plasticizing cylinder with an extrusion unit detachably connected therewith for feeding plastic material thereto and forcing the plastic melt therefrom, in which the heating cylinder is mounted for bodily displacement laterally from the extrusion unit to position for inspection or cleaning with the extrusion unit thereby exposed for cleaning or removal and replacement of parts.

A further object is to provide a supporting track structure for such a heating cylinder of a detachably connected extrusion unit and heating cylinder assembly by which the heating cylinder may be readily displaced manually to and from its operative connected position without the need for special tools or lifting and moving equipment.

Another object is to provide in a plastic extrusion apparatus for efficient dispersion and mixing of color with and through the plastic mass being plasticized and extruded by the apparatus.

And a further object is to provide a plastic extrusion apparatus having the foregoing characteristics with increased efficiency which will be of simple mechanical design and construction capable of continuous operation at maximum capacity with minimum maintenance but maximum uniformity in the extruded products.

With the foregoing and various other objects and results in view which will be readily apparent to those skilled in the art, my invention consists in certain novel features in design and construction and in functioning, all as will be more fully referred to and specified hereinafter.

Referring to the accompanying drawings in which similar reference characters refer to corresponding parts throughout the several figures thereof:

FIG. 3 is a view in longitudinal section through a modified form of extruder screw of the invention in mounted, assembled position in the barrel of the extrusion component of the machine.

FIG. 5 is a view in longitudinal section through a form of mixing head of the invention for mounting in the discharge end of the heating cylinder component of the extrusion machine.

An extrusion machine or apparatus embodying the principles and features of my invention for the continuous extrusion molding of thermoplastic materials is illustrated in the accompanying drawings and is described and explained hereinafter as one possible example form of such a machine. Basically the extrusion machine embodies an extrusion component E of the power driven screw type and a heating cylinder or plasticizing chamber C of the melt extractor type of my inventions as disclosed in my copending U.S. patent applications Serial Nos. 390,879, now abandoned and 489,080, now U.S. Patent No. 2,962,-759. In accordance with my present invention the extrusion component E is essentially and primarily a granulated plastic material conveyor and extrusion pressure generating component which takes the granulated plastic materials, usually in granular form, and continuously forces such material under constant pressure into the heating or plasticizing cylinder C where the material is melted or plasticized and the resulting melt is continuously extracted and forced under pressure therefrom for extrusion through a suitable extrusion die connected with the discharge end of the heating cylinder. Such a machine of my invention is continuously operated with continuous feed of cold granular material to the extrusion component E wherein extrusion pressures are developed which are constant and continuously applied through the heating cylinder component C with the plastic melt being continuously forced from the heating cylinder through the forming die attached at the discharge end of the latter.

Figure 1:
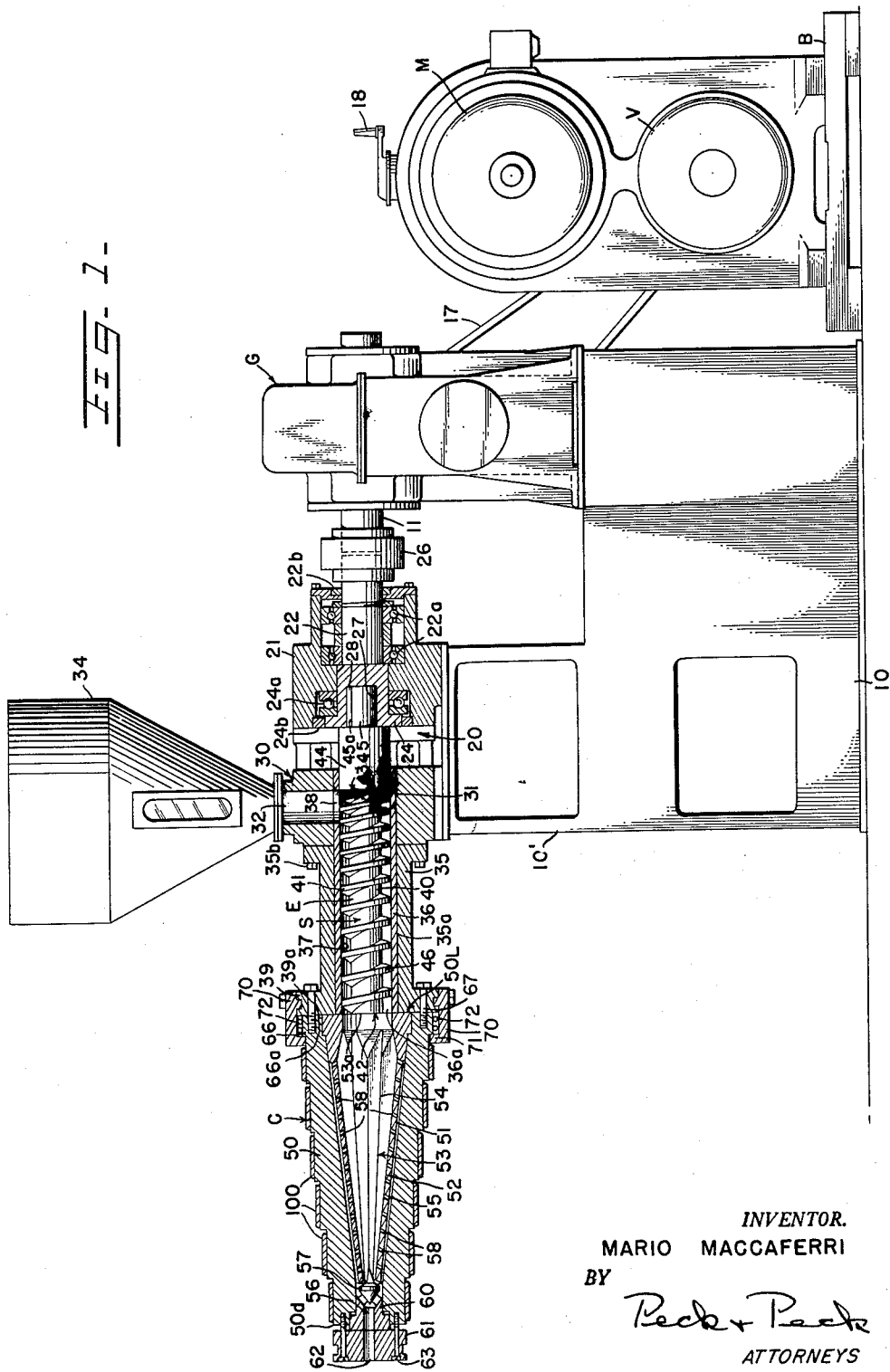
FIG. 1 is a view in side elevation of one form of extrusion machine of my invention with the plastic extrusion component and the heating cylinder component thereof being shown in vertical longitudinal section.

The machine of this particular example, referring to FIG. 1 of the accompanying drawings, happens to include a suitable frame or base structure 10 which mounts at the rear end thereof an upwardly extending gear reducer unit G having a power output shaft 11 which extends horizontally forwardly therefrom at the forward side thereof. This gear reducer unit G receives power from and is driven by a variable speed drive unit V which in this instance is mounted as a unit assembly with an electric driving motor M mounted on base B in driving connection with the variable speed drive unit. The assembly of driving motor M and variable speed unit V driven thereby may be mounted on a separate base B, as shown in this example, or the base B may be formed as a part of the machine frame or base structure 10. The variable speed drive unit V includes a power take-off shaft 12 on which there is mounted a multi-belt pulley of the V-belt type driven thereby. The gear reducer unit G has a driven or power input shaft 15 which extends horizontally therefrom above but parallel with the shaft 12 of the variable speed drive unit V. A multi-belt sheave 16 is mounted on the speed shaft 15 for driving such shaft. Multiple V belts 17 are mounted on and around and between the driving pulley 14 of the variable drive unit V and the driven sheave 16 of the gear reducer unit G. The gear reducer unit G is thus driven by and receives power from the pulley 14 of the motor driven variable speed drive V through the V belts 17 and the sheave 16 on the power input shaft 15 of the gear reducer unit G. The power take-off shaft 11 of the gear reducer unit G is thus driven from the motor M under the control as to rate of speed of rotation by the variable drive unit V which is adjustable through a desired range of speeds by means of the manual adjusting lever 18 shown in FIG. 1.

The frame or base of the machine 10 is provided at the forward end thereof with an upwardly extending pedestal or table structure 10′ on which the base assembly 20 of the extrusion component E is mounted. This base assembly 20 includes a bearing mounting block structure 21. The bearing block structure 21 mounts and journals therein in position extending horizontally therethrough a driving shaft 22 which is in axial alignment with and which is driven from the power off-take or drivng shaft 11 of the gear reducer unt G. This driven shaft 22 is journaled at its rear section in the spaced annular radial bearings 22a of the anti-friction or ball types. The driving shaft 22 is provided at its forward end with a radially outwardly extending flange 24 therearound and the forward section of the shaft is journaled in an annular thrust bearing 24a of the anti-friction or ball type mounted between the shaft flange 24 and the bearing block structure 21, as will be clear by reference to FIG. 1. A suitable oil seal 22b is provided around the shaft 22 at the outer side of the bearing assemblies 22 and a suitable oil seal 24b is provided at the forward end of the driven shaft 22 around the radial end flange 24 of the shaft. This driving shaft 22, so mounted and journaled, is coupled in positive driven connection with the shaft 11 by any suitable shaft coupling, such as the coupling 26 as shown in FIG. 1 of the drawings.

The extrusion component E includes in the base structure 20 thereof a cold plastic feed box 30 which is located in this instance at the forward end of the base pedestal or table 10′ spaced forwardly fromt he bearing block 21. This feed box 30 has a horizontally disposed bore 31 therethrough which is in axial alignment with the power driven shaft 22. A vertically disposed feed passage 32 is provided in the feed box 30 with its axis preferably normal to the axis of the bore 31. The passage 32 of the feed box 30 opens at its inner end into the bore 31 and is open at its upper end for receiving cold plastic material from a material hopper 34 which is suitably mounted in position on the upper end of the feed box with the lower discharge end of the hopper opening into the upper intake end of the feed passage 32. A barrel 35 having in this instance a constant internal diameter bore 35a therethrough of the same diameter as the bore 31 through the feed bov 30, is secured in horizontally disposed position to the forward or front side of the feed box 30 by suitable bolts or screw members 35b, with the bore 35a through the barrel in axial alignment with and forming a forward continuation of the bore 31 through the feed box. A liner 36 is mounted and secured in and through the aligned bores 35a of the barrel 35 and 31 of the feed box 30 with the rear end of this liner terminating at the rear side face of the feed box 30 and the forward end thereof terminating at and flush with the forward face surface on the outer or forward end of the barrel 35. The liner 35 provides the smooth surface bore 37 therethrough of constant internal diameter throughout the length of the liner. The liner 36 is also provided with a cold plastic intake opening 38 through the upper side thereof at and aligned with the feed passage 32 through the feed box 30. The intake opening 38 through the liner 36 into the bore 37 thereof has the same internal diameter as the internal diameter of the lower end discharge opening of the feed passage 32 and is in precise axial alignment with the latter opening. The liner 36 is formed of any suitable material to meet the conditions to which it is subjected in operation and use but preferably may be formed of a nickel steel alloy of high nickel content which is of high abrasion resistance and non-corrosive as to certain plastics.

An extrusion or conveyor screw S is rotatably mounted in and extends through the liner 36 in the barrel 35. The extrusion screw S is comprised of the shaft 40 having the flights 41 therearound extending from the discharge end 42 of the screw at the discharge end of the barrel 35 to a location on the screw shaft 40 substantially in the vertical plane of the rear side edge of the cold plastic intake opening 38 through the liner 36, and which constitutes the intake end 43 of the screw. The shaft 40 of the screw S extends rearwardly as a smooth external surface shaft section 44 of enlarged diameter from the rear or intake end 43 of the flights 41 of the screw. The forward end of the driven shaft 22 in the bearing block 21 is formed with an axial bore 27 extending inwardly a distance thereinto and this bore is provided with a suitable key 28 therein. The rear end of the screw shaft section 44 is provided with a rearwardly extending reduced diameter coupling shaft 45 having an external diameter to form a relatively tight sliding fit in the bore 27 of shaft 22. The coupling shaft 45 of the screw 40 is provided with a suitable keyway 45a therein for slidably receiving and fitting onto the key 28 in the bore 27 of the driven shaft 22. The extrusion screw S is assembled into the extrusion unit E by inserting it through the barrel liner 36 from the open forward discharge end thereof until the coupling shaft 45 of the screw shaft 40 is received in the bore 27 of the driven shaft 22 with the key 28 received in the keyway 45a thus rotatably coupling the extrusion screw S in positive driven connection with the drive shaft 22.

Following the teachings of my invention the extrusion screw S is essentially a conveyor or feed and extrusion pressure generating screw and is of a design and construction to generate a minimum of heat from friction, shear and other factors during operation thereof to continuously feed and apply extrusion pressures to the cold plastic mass being forced thereby to the heating or plasticizing cylinder C. Hence the cold particles of the plastic fed to the screw S at its intake 43 at the feed box 30 will be substantially unplasticized and in granular but densely compacted form when the plastic reaches the discharge of the screw S at the open discharge end of the extrusion component E. This is accomplished by providing an extrusion screw so designed as to give minimum resistance to flow or displacement of the cold plastic material being forced thereby under constant pressure through the extrusion unit E by rotation of the screw. In one form of such an extrusion screw S shown assembled in the example machine of FIG. 1, the flights 41 of the screw are of variable pitch, being progressively increased in pitch from the intake end 43 of the screw to the discharge end 42 thereof, but are of uniform or equal depth, that is to say, the radial widths of the flights from their bases at the screw shaft 40 to their outer edges 46 are equal throughout the length of the screw. It is to be particularly noted that in the form of the screw S the outer edges 46 of the flights 41 have substantial width and present transversely planar surfaces which are parallel and have rotating sliding engagement with the smooth interior surface of the liner 36 of the barrel 35 in which the screw S is rotatably mounted. With the screw flights 41 progressively increasing in pitch from the intake end to the discharge end of the screw S, it follows that the volumetric capacity of the spaces between the flights along the screw from the intake end to the discharge end thereof progressively increases, thereby reducing the resistance to the flow or displacement of the cold plastic material through the barrel by rotation of the screw. With the screw S so designed there is not only minimum resistance to flow of the plastic material but also minimum conversion to heat of the mechanical energy applied to rotate and drive the screw. The screw S thus is essentially a conveyor or feed screw of low resistance, low friction and minimum heat generation so that the cold plastic material that is fed to the extrusion unit E from the feed box 30 as solid and usually granular plastic, reaches the discharge end 42 of the screw S in substantially solid and unplasticized but densely compacted form for discharge into the heating cylinder C for plasticizing and melt extraction therein.

The extension unit, such as the unit E of the example machine of FIG. 1 is essentially an unheated and non-plasticizing unit in the preferred forms thereof, with no heat being applied externally and with minimum heat being developed internally from the operation of the unit. The primary function of any extrusion unit of the invention is to continuously convey or feed cold plastic material while at the same time cooperatively functioning with the heating cylinder or plasticizing chamber component of the invention to develop and apply continuously a constant pressure to the melted plastic at the discharge end of the heating cylinder for continuous extrusion through any suitably shaped forming or molding means, such as an extrusion die. Preferably the extrusion screw of an extrusion unit, such as the screw S of the unit E, is operated for a given plastic under given conditions of extrusion and molding at a constant rate of speed with the development and maintenance of a constant extrusion pressure on the plastic melt at the discharge or extrusion end of the heating cylinder.

While the extrusion screw S of the unit E of FIG. 1 is in a form having flights of variable pitch with uniform depth, alternative forms and designs may be employed to obtain the same results of increasing volumetric content between the flights from the intake end to the discharge end thereof with a minimum resistance to flow or displacement of material by the screw along with the other desired results as hereinbefore discussed. For example, in FIG. 3 of the accompanying drawings I have shown an alternate form of screw S' in which the flights 41' thereof are of uniform pitch throughout the lengths thereof but with the depths of the flights progressively varying and increasing from the intake to the discharge end of the screw. This may be accomplished in the manner shown in FIG. 3 by providing the screw shaft 40' of progressively decreasing external diameters from the intake end of the screw to the discharge end thereof, so that in effect the screw shaft is tapered in the direction of flow along the shaft. With the screw S' of FIG. 3 there is thus provided progressively increasing volumetric capacity and content between the flights 41' from the intake end to the discharge end of the screw, so that, as with the form of screw S, there will be a minimum resistance to flow or displacement of the cold plastic material through the extrusion E from the feed box 30 to the discharge end thereof.

The heating cylinder or plasticizing chamber C is removably mounted and attached to the forward or outer end of the barrel 35 of the extrusion unit E in horizontally disposed position extending forwardly therefrom in continuation of the barrel of the extrusion unit. In this particular instance the barrel 35 of the extrusion unit E is provided at its outer end with the radially outwardly extending flange 39 therearound. The flange 39 is formed by suitable machining or is otherwise finished to present an annular planar seating surface area 39a surrounding the discharge opening from the barrel 35 and its liner 36, on and against which surface a complementary seating surface of the heating cylinder C is adapted to abut and seat with the heating cylinder in mounted position of the latter on the barrel.

The heating cylinder C is of the so called "Maccaferri" melt extractor type for functioning in accordance with the principles disclosed and explained in my above referred to United States patent applications Serial No. 390,879 and Serial No. 489,080 in which several forms of such types of heating cylinders are shown. The heating cylinder C which forms the plasticizing component of the example machine of FIG. 1 is of the tapered bore type and includes the heat conducting material cylinder or shell 50 having a bore 51 disposed axially therethrough in which there is tightly seated and nested a perforated melt exterior sleeve unit 52 of heat conducting material in direct heat transfer contact with the shell. The sleeve 52 is provided with the tapered main passage 53 therewithin disposed axially therethrough. This melt extractor sleeve 52 is provided with longitudinally disposed, radially inwardly extending heat conducting material ribs 54 spaced apart therearound with their interior edges spaced apart and forming a central tapered passage therebetween with the main tapered passage 53 of the sleeve unit 51 being broken up by the spaced ribs 54 into a plurality of forwardly inclined passages therebetween.

A plurality of longitudinally disposed channels 55 are provided between the cylinder or shell 50 and the melt extractor sleeve unit 52, with these channels being spaced apart around the sleeve unit and extending to and discharging at locations spaced inwardly from the forward, reduced diameter discharge end 50D of the cylinder. A plurality of perforations 58 are formed in and through the body of the sleeve unit 52 along each of the channels 55 placing the tapered chamber within the sleeve unit in communication with the channels for extrusion of melted plastic from and around the periphery of the mass of plastic in the sleeve chamber and flow thereof into and through the channels 55 to the discharge end of the cylinder. In the discharge end 50D of the cylinder shell 50 there is provided a discharge passage 56 which at its inner intake end is in communication with a space or chamber between its said inner end and the discharge end of the sleeve unit 51, as will be clear by reference to FIG. 1.

A relatively small dimensioned spreader or retainer member 57 of double cone shape is mounted in the space between the forward discharge end of the melt extractor sleeve unit 51 and the intake end of the discharge passage 56 from the cylinder C. This retainer 57 provides relatively narrow passages therepast and therearound for flow therethrough of the plastic melt extracted from the main chamber of the sleeve unit 51 through the channels 55 and of any melted plastic at the inner end of the main chamber or passage of the cylinder unit. However, essentially this retainer 57 functions to hold the plastic mass which is being fed to and continuously maintained in the sleeve unit by the continuous operation of the extrusion screw S of the extrusion unit E, with the plastic melt extracted from this mass being forced under the constant pressures applied thereto by the extrusion screw through the mass of plastic in the sleeve unit to the discharge passage 56 for pressure discharge therefrom.

In this example the discharge passage 56 through the forward discharge end 50D of the shell 50 of the heating cylinder unit C is formed in a suitable bushing member 60 which is inserted and secured in the end of the bore in shell 50 at the open discharge end 50D thereof. The forward discharge end 50D of the shell 50 mounts thereon over and against the bushing 60, a die mounting head 61 which has a discharge passage 62 therein in communication with and in axial continuation of the discharge passage 56 through the bushing 60. This die mounting head 61 is attached in fixed position to the forward end of the shell 50 and the bushing 60 mounted therein by suitable machine screws or the like 63. The forward or front side of the die mounting head 61 is presented as a generally planar surface onto which any suitable die may be mounted and attached for extrusion therethrough of the plastic melt from passage 62, as will be readily understood by those skilled in the art.

Figure 2:
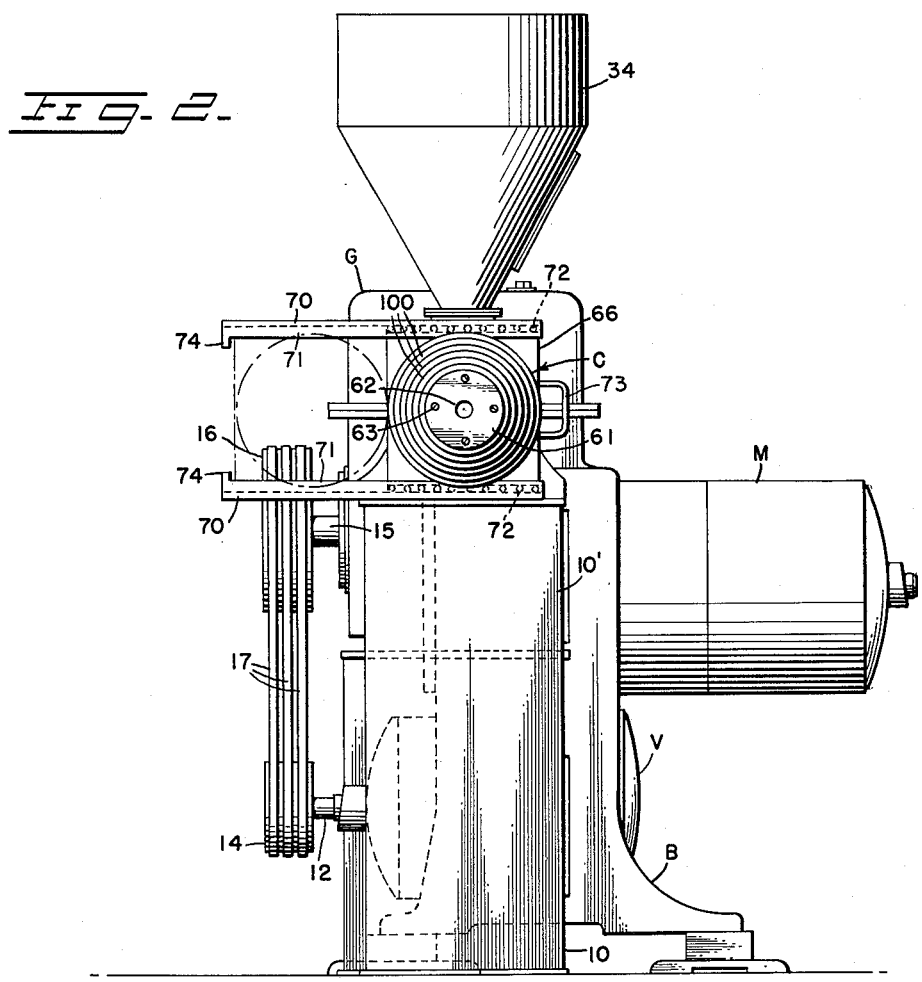
FIG. 2 is a view in front elevation of the machine of FIG. 1 and showing particularly the supporting track and carriage structure for bodily displacement laterally of the heating cylinder from and to operative position detachably connected to the discharge end of the extrusion component of the machine.
Figure 4:
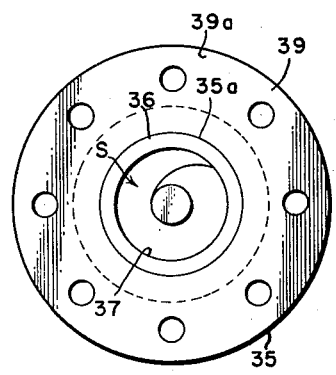
FIG. 4 is a view in front elevation of the discharge end of the extrusion component of the machine with the heating cylinder component disconnected and removed.

The shell 50 of the heating cylinder C is in this particular instance provided at its large diameter intake end 50L with a plate flange 66 which extends radially outwardly therefrom and therearound and is of substantially square plan form as will be clear by reference to FIG. 2. The inner or rear surface 66a of the flange 66 is suitably finished to provide a complementary seating surface to abut against and seat on the forward surface 39a of the flange 39 of barrel 35 of the extrusion unit E. In mounted position the heating cylinder unit C is attached to the flange 39 at the discharge end of the barrel 35 by suitable machine screws, bolts or the like 67 which extend forwardly through the flange 39 into engagement with suitably internally threaded bores in the flange 66 of the heating cylinder C. The mounted assembled position of the heating cylinder C on the extrusion unit E is shown in FIG. 1. In its assembled position the intake opening 53a of the main passage 53 of the melt extractor sleeve 52 is in axial alignment and communication with the discharge opening 36a of the liner 36 of barrel 35, this intake opening 53a having the same diameter as and being precisely aligned with the discharge opening 36a from the barrel.

As a feature of my present invention I have provided for the movement bodily laterally of the heating cylinder C between its operative assemble position on the extrusion unit E and inactive position removed therefrom. In the present example I carry out this feature by providing the parallel, horizontally disposed and vertically spaced rails or guideways 70 which are rigidly attached at their inner ends to and across the upper and lower sides, respectively, of the flange 39 on the discharge end of the barrel 35 of extrusion unit E. These rails 70 of this example referring to FIG. 1, are of angle cross sections to provide at and along their forward sides the laterally extending inwardly turned flanges 71 spaced forwardly from the flange 39 to thus form therewith tracks or guideways. The square or rectangular shaped plate flange 66 provides in effect a carriage which is slidably mounted and received at its upper end lower edge portions in the upper and lower rails 70, respectively, as shown by FIG. 2. This carriage-forming plate flange 66 is constrained by these rails to straight line movements therein in a horizontal path toward and from the extrusion unit E. Linear bearings 72 of the antifriction or ball type are interposed between the upper and lower edges of the plate carriage 66 and the upper and lower rails 70, respectively, for minimum friction movement of the heating cylinder unit C with the carriage forming plate flange 66 on the rails 70. Preferably a handle 73 is provided on a side edge of the plate flange 66 for manual displacement of the heating cylinder C on the rails 70. The outer ends of the rails 70 are provided with suitable inturned stops at the outer ends thereof for engagement by the outer edge corner portions of the flange 66 in the outwardly displaced inactive position of the heating cylinder C when disconnected and removed from the extrusion unit E. With the heating cylinder C in its assembled operative position attached to the extrusion unit E as shown in FIG. 1 and in full lines in FIG. 2, if it is desired for any reason to laterally displace the heating cylinder unit C from the extrusion unit E to position removed therefrom for access thereto and to the discharge end of the extrusion unit, it is only necessary for the operator to disconnect the heating cylinder from the extrusion unit by removing the screws 67 and then by grasping the handle 73 push and slide the heating cylinder on the rails 70 to position with the plate flange 66 engaged against the stops 74. In this position the heating cylinder unit C is completely removed from the extrusion unit E and accessible for inspection, cleaning or any other necessary operation, while at the same time the discharge end of the barrel 35 of the extrusion unit E and the extrusion screw S therein are also exposed so that the extrusion screw S may then be readily withdrawn from and replaced in the barrel 35 for cleaning. When the desired services have been carried out on the heating cylinder C or on the extrusion unit E, the operator may then displace the heating cylinder C inwardly on the rails 70 to operative position aligned with the extrusion unit and attach these units into their operative assembled relation of FIG. 1 by the screws 67.

Neither the extrusion unit E nor the heating cylinder unit C of the melt extractor type, is essentially a good plastic mixer when in the combination and relationship thereof for a machine of my invention for continuous or zero cycle extrusion. Hence, when it is desired to mix color with the plastic being extruded by the machine, I prefer to provide a mixing head interposed between the melted plastic discharge from the heating cylinder unit C and the die (not shown) through which such melted plastic is to be extruded. In FIG. 5 of the drawings I have shown one form of such a mixing head and I have identified this form generally by the reference character H. The mixing head H includes a barrel or sleeve member 80 of cylindrical form having an axially disposed mounting neck 81 extending from one end thereof. A melted plastic discharge passage 82 extends axially through this neck from the outwardly tapered inlet opening 83 to an enlarged diameter counterbore 84, with this counterbore discharging at its outer or forward end into a further counterbore 85, which in this instance is internally threaded. Within the chamber formed by the intermediate counterbore 84 I mount a plurality of breaker or mixing plates 86 which are provided with apertures or slots 87 therethrough with these plates being disposed transversley across and spaced apart axially of the bore 84 so that melted plastic discharged into that bore through the passage 82 must pass through the apertures or slots 87 of the plates with the result that a thorough and complete dispersion and mixing of color with and in the melted plastic will be effected.

The mixing head H may be mounted in the discharge end of the shell 50 of the heating cylinder unit C in place of and as a substitute for the bushing 60 of the machine of FIG. 1, with a suitable die mounting head such as the head 61 then suitably mounted on and attached at the outer end of the head H for discharge of mixed melted plastic through the bore 85 from the breaker plates 86 to and through the head to a suitable die mounted on the latter. Such mounting of the mixing head H is shown in FIG. 5 of the drawings, with the mounting neck 81 fitted into the discharge end 50D of the heating cylinder shell 50 so that melted plastic is forced outwardly through bore 82, bore 84 with the breaker plates 86 therein, and the discharge end counterbore 85 to and through a die mounting head 61 to a suitable die mounted on the latter.

In carrying on continuous extrusion of plastic material in accordance with my invention and the machine therefor of FIG. 1, the extrusion or feed screw S of the extrusion unit E is set into rotation and feeding and extrusion pressure generating operation by starting the motor M, which through the power transmission including the variable speed drive V and the gear reducing unit G power drives this extrusion screw. Cold solid plastic usually in granular form is then charged into the feed hopper 34 and is continuously fed by gravity in this instance to the feed screw S through the feed passage 32 and feed opening 38 through the liner 36 which encases and in which the feed screw is rotatably mounted. In the machine of FIG. 1 the feed screw S of the extrusion unit E has a range of rates of speed through which it may be driven by the power drive therefor. The quantity of plastic fed into and through the extrusion unit E by the feed screw S is controlled or metered with precision by the rate of speed of rotation of the feed screw. With the continuous feed of cold solid plastic in granular form to the feed screw S in the extrusion unit E, the plastic will be conveyed or fed by the screw forwardly through the extrusion unit with the resistance to flow or displacement being progressively reduced as the plastic passes into and occupies the progressively increased volumetric capacities of the spaces between the flights 41 of the feed screw in the flow of the plastic to the discharge end 42 of the screw. Following the teachings of my invention the plastic delivered at the discharge end 42 of the extrusion unit E will be substantially unheated and in solid form though densely compacted and will be delivered in this condition through the intake opening 53a of the heating cylinder C.

When the plastic fed by the extrusion screw S to the heating cylinder unit C completely fills the main tapered passage 53 of the latter unit, it will be held and constrained in the passage 53 by the perforated wall of the melt extractor sleeve unit 51 and the retainer 57 at the discharge end of that passage. Hence pressure will be built up by the continued operation of the feed screw S of the extrusion unit E so that the entire mass of plastic will be densely compacted and held in the heated main passage 53 of the melt extractor sleeve unit 51 with the thin layer of plastic in direct contact with the inner surface of the sleeve unit continuously plasticizing and the resulting melt being continuously extracted by the pressures exerted thereon from the extrusion unit E. This plastic melt is continuously forced through and from the channels 55 past the retainer 57 and through the discharge passages 56 and 62 to the extrusion die or other plastic forming component. With the example machine of FIG. 1 it may be considered that the extrusion screw S of the extrusion unit E is capable of exerting pressures on the plastic being continuously maintained in the heating cylinder unit C within the range of 2,000 to 10,000 pounds per square inch. However, in accordance with the functioning and method of my invention the operation of the extrusion machine is continuous but at a constant pressure during a given extrusion operation and, of course, this constant pressure is exerted and maintained by power driving the extrusion screw S at a constant rate of speed with the constant metered feed of cold plastic particles thereto at the intake end 43 of the feed screw determined by the constant rate of rotation of the feed screw.

By utilizing the combination in the functional relationship as herein explained, of the non-heated and non-plasticizing power driven extrusion unit E with the heating cylinder unit C of the melt extraction type which functions on the principles as disclosed and explained in my hereinbefore identified U.S. patent applications, there is assured constant immediate extraction of the plastic melt from the heating cylinder unit C so that overheating or burning of the plastic so frequently encountered with conventional methods and machines for plastic extrusion is eliminated or substantially reduced. Thus by the method of the invention cold plastic is placed under a constant pressure and fed in unplasticized state to a heating cylinder of the melt extractor type wherein the plastic mass is built up and maintained continuously under constant pressure by replenishment of unplasticized plastic as the plastic melt from the mass in the heating cylinder is being constantly extracted and forced under pressure to and through the extrusion die.

A machine of the invention eliminates the cost of heated plasticizing extruder barrels with the complications inherent therein, and plasticizers in a cylinder where heating presents no particular complications. And further the detachable mounting of the heating cylinder with provision by which the cylinder can be manually displaced to and from attached, operative position quickly and easily, makes it possible to readily clean the cylinder and the extrusion unit when changing extrusion operations from one colored plastic to another.

The heating cylinder C of the melt extractor type is heated by the usual electric heating bands 100 mounted on and around the exterior of and in direct heat transfer relation with the heat conducting material shell 50. Thus plasticizing heat is supplied to the shell and by conduction therefrom through the heat conducting material melt extractor sleeve unit 51 to the mass of plastic therein.

It will be noted that by the design of the feed screws S and S′ with their variable pitch and increasing volumes between flights in the direction of flow, not only is the resistance to flow reduced but also backing up plastic material is prevented when the pressure builds up. Such screws also produce greater pressure on the plastic being fed thereby and prevent any tendency of the plastic to reverse its direction of movement. Thus such a screw conveys the plastic at all times in the forward direction even during build-up of front pressure and thereby generates and maintains an efficient pressure on the plastic at the intake of the heating cylinder.

It will also be evident that various changes, modifications, variations, substitutions, eliminations, and additions may be resorted to without departing from the broad spirit and scope of my invention, and hence, I do not desire or intend to limit my invention in all respects to the exact and specific example embodiments of the invention as herein disclosed, except as may be required by intended specific limitation thereto appearing in any of the claims hereto appended.

What I claim is:

1. In a plastic extruding machine, in combination, a supporting frame; a plastic feeding unit mounted on said supporting frame; said feeding unit including a barrel having a discharge opening through one end thereof, and a feed screw rotatably mounted in said barrel; a heating cylinder for melting plastic therein; said heating cylinder having an intake opening for unmelted plastic through one end and a discharge opening for melted plastic through the opposite end thereof; said heating cylinder being detachably connected at its intake opening end to the discharge opening end of said barrel of said feeding unit; a heating cylinder supporting structure on said supporting frame across said discharge opening end of said barrel; said supporting structure having an extension extending laterally outwardly a distance from one side thereof; and said heating cylinder when detached from said barrel of said feeding unit being supported on said supporting structure and displaceable bodily thereon laterally outwardly onto said extension of said supporting structure to position clear of said discharge opening of said barrel.

2. In the combination of claim 1, said heating cylinder supporting structure including said extension thereof, providing thereon spaced, parallel rails with said intake end of said heating cylinder positioned therebetween and slidably mounted therein.

3. In the combination of claim 1, said heating cylinder having a radially outwardly extending flange at the intake end thereof; said heating cylinder supporting structure including said extension thereof providing thereon spaced rails; and said flange at the intake end of said heating cylinder being positioned between and slidably mounted at opposite edge portions thereof in said rails, respectively, for displacement bodily of said heating cylinder thereon.

4. In a plastic extrusion machine, in combination, an unmelted plastic feeding unit including a barrel providing an axial feeding passage therethrough having an intake opening for unmelted plastic at one end and a discharge opening coaxial with said passage at the opposite end thereof for discharge of unmelted plastic therefrom; a feed screw rotatably mounted in said barrel enclosed thereby and located within and confined to said feeding passage between said intake opening and said discharge opening; said feed screw being formed for feeding unmelted plastic through said feeding passage and for delivering such plastic to and discharging it through said discharge opening as unmelted plastic; a plasticizing cylinder assembly having an unmelted plastic receiving, axial passage therethrough for heating unmelted plastic to form plastic melt therein; said axial passage through said plasticizing cylinder assembly having an intake opening coaxial therewith at one end thereof for unmelted plastic and a restricted discharge opening coaxial therewith at the opposite end thereof for pressure extrusion therethrough of plastic melt from said receiving passage; means for heating unmelted plastic in said receiving passage of said plasticizing cylinder assembly to form plastic melt therein; and powered means connected with said feed screw in said feeding unit for continuous rotation of said feed screw to continuously feed unmelted plastic into and to continuously maintain pressure on said plastic in said receiving passage of said plasticizing cylinder assembly to thereby continuously extrude plastic melt formed therein under pressure through said restricted discharge opening from said receiving passage of said plasticizing cylinder assembly, said feed screw of said feeding unit having flights therealong and therearound completely confined to and enclosed within said axial feeding passage of said barrel of said feeding unit; and said feed screw and said flights thereon providing progressively increasing volumetric capacities therebetween from said intake opening to said discharge opening of said feeding passage.

5. In a plastic extrusion machine, in combination, an unmelted plastic feeding unit including a barrel providing an axial feeding passage therethrough having an intake opening for unmelted plastic at one end and a discharge opening coaxial with said passage at the opposite end thereof for discharge of unmelted plastic therefrom; a feed screw rotatably mounted in said barrel enclosed thereby and located within and confined to said feeding passage between said intake opening and said discharge opening; said feed screw being formed for feeding unmelted plastic through said feeding passage and for delivering such plastic to and discharging it through said discharge opening as unmelted plastic; a plasticizing cylinder assembly having an unmelted plastic receiving, axial passage therethrough for heating unmelted plastic to form plastic melt therein; said axial passage through said plasticizing cylinder assembly having an intake opening coaxial therewith at one end thereof for unmelted plastic and a restricted discharge opening coaxial therewith at the opposite end thereof for pressure extrusion therethrough of plastic melt from said receiving passage; means for heating unmelted plastic in said receiving passage of said plasticizing cylinder assembly to form plastic melt therein; and powered means connected with said feed screw in said feeding unit for continuous rotation of said feed screw to continuously feed unmelted plastic into and to continuously maintain pressure on said plastic in said receiving passage of said plasticizing cylinder assembly to thereby continuously extrude plastic melt formed therein under pressure through said retricted discharge opening from said receiving passage of said plasticizing cylinder assembly, said feed screw of said feed unit having flights therealong and therearound of constant depth but progressively increasing in pitch from said intake opening to said discharge opening of said feeding passage; and said flights of said feed screw being completely confined to and enclosed within said feeding passage of said feeding unit between said intake opening and said discharge opening of said feeding passage.

6. In a plastic extrusion machine, in combination, an unmelted plastic feeding unit including a barrel providing an axial feeding passage therethrough having an intake opening for unmelted plastic at one end and a discharge opening coaxial with said passage at the opposite end thereof for discharge of unmelted plastic therefrom; a feed screw rotatably mounted in said barrel enclosed thereby and located within and confined to said feeding passage between said intake opening and said discharge opening; said feed screw being formed for feeding unmelted plastic through said feeding passage and for delivering such plastic to and discharging it through said discharge opening as unmelted plastic; a plasticizing cylinder assembly having an unmelted plastic receiving, axial passage therethrough for heating unmelted plastic to form plastic melt therein; said axial passage through said plasticizing cylinder assembly having an intake opening coaxial therewith at one end thereof for unmelted plastic and a restricted discharge opening coaxial therewith at the opposite end thereof for pressure extrusion therethrough of plastic melt from said receiving passage; means for heating unmelted plastic in said receiving passage of said plasticizing cylinder assembly to form plastic melt therein; and powered means connected with said feed screw in said feeding unit for continuous rotation of said feed screw to continuously feed unmelted plastic into and to continuously maintain pressure on said plastic in said receiving passage of said plasticizing cylinder assembly to thereby continuously extrude plastic melt formed therein under pressure through said restricted discharge opening from said receiving passage of said plasticizing cylinder assembly, said feed screw being of decreasing external diameters from said intake opening to said discharge opening and having flights therealong and therearound of constant pitch; and said flights of said feed screw being confined to and completely enclosed within said barrel of said feeding unit between said intake opening and said discharge opening of said feeding passage.

7. In a plastic extrusion machine, in combination, an unmelted plastic feeding unit including a barrel providing an axial feeding passage therethrough having an intake opening for unmelted plastic at one end and a discharge opening coaxial with said passage at the opposite end thereof for discharge of unmelted plastic therefrom; a feed screw rotatably mounted in said barrel enclosed thereby and located within and confined to said feeding passage between said intake opening and said discharge opening; said feed screw being formed for feeding unmelted plastic through said feeding passage and for delivering such plastic to and discharging it through said discharge opening as unmelted plastic; a plasticizing cylinder assembly having an unmelted plastic receiving, axial passage therethrough for heating unmelted plastic to from plastic melt therein; said axial passage through said plasticizing cylinder assembly having an intake opening coaxial therewith at one end thereof for unmelted plastic and a restricted discharge opening coaxial therewith at the opposite end thereof for pressure extrusion therethrough of plastic melt from said receiving passage; means for heating unmelted plastic in said receiving passage of said plasticizing cylinder assembly to form plastic melt therein; and powered means connected with said feed screw in said feeding unit for continuous rotation of said feed screw to continuously feed unmelted plastic into and to continuously maintain pressure on said plastic in said receiving passage of said plasticizing cylinder assembly to thereby continuously extrude plastic melt formed therein under pressure through said restricted discharge opening from said receiving passage of said plasticizing cylinder assembly, said feed screw being of substantially constant external diameters from said intake opening to said discharge opening of said feeding passage and having flights therealong and therearound progressively increasing in pitch from said intake opening to said discharge opening; and the length of said feed screw of constant external diameters and said flights therealong being confined to and completely enclosed within said feeding passage between said intake opening and said discharge opening of the latter.

(References on following page)

References Cited in the file of this patent

UNITED STATES PATENTS

| | | |
|---|---|---|
| 635,026 | Saunders | Oct. 17, 1899 |
| 1,946,740 | Hall | Feb. 13, 1934 |
| 2,519,014 | Bankey | Aug. 15, 1950 |
| 2,573,440 | Henning | Oct. 30, 1951 |

FOREIGN PATENTS

| | | |
|---|---|---|
| 326,112 | Germany | Sept. 23, 1920 |

OTHER REFERENCES

Bernhardt et al.: (Polyliner Improves Injection Molding), Modern Plastics, vol. 33, No. 6, pages 109–144, pub. by Breskin Publications Inc., Bristol, Conn.